(12) United States Patent
Ogata et al.

(10) Patent No.: US 11,941,188 B2
(45) Date of Patent: Mar. 26, 2024

(54) ELECTRONIC PEN

(71) Applicant: Wacom Co., Ltd., Saitama (JP)

(72) Inventors: Mamoru Ogata, Saitama (JP); Takenori Kaneda, Saitama (JP); Kenichi Ninomiya, Saitama (JP); Takayuki Arai, Saitama (JP); Kohei Tanaka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/193,451

(22) Filed: Mar. 30, 2023

(65) Prior Publication Data

US 2023/0244331 A1 Aug. 3, 2023

Related U.S. Application Data

(63) Continuation of application No. PCT/JP2021/036591, filed on Oct. 4, 2021.

(30) Foreign Application Priority Data

Nov. 6, 2020 (JP) ................. 2020-185698

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01)

(58) Field of Classification Search
None
See application file for complete search history.

(56) References Cited

U.S. PATENT DOCUMENTS 10,365,733 B2 7/2019 Ninomiya et al.
2020/0209992 A1 7/2020 Kwak et al.

FOREIGN PATENT DOCUMENTS

| JP | 2018-18149 A | 2/2018 |
| WO | 2015/122280 A1 | 8/2015 |
| WO | 2017/149879 A1 | 9/2017 |

OTHER PUBLICATIONS

International Search Report, dated Nov. 16, 2021, for International Patent Application No. PCT/JP2021/036591. (5 pages) (with English-language translation).

*Primary Examiner* — Nicholas J Lee
(74) *Attorney, Agent, or Firm* — Seed IP Law Group LLP

(57) ABSTRACT

Provided is an electronic pen including an electronic pen main part including a first sealing member that covers circumference of a tip side of the electronic pen main part and a second sealing member disposed along an outer edge of the electronic pen main part at a position separate from a tip toward a rear end side of the electronic pen main part, and an inside body that is tubular and has an inner wall surface with which the first sealing member and the second sealing member come into contact through insertion of the tip side of the electronic pen main part into the inside body.

5 Claims, 4 Drawing Sheets

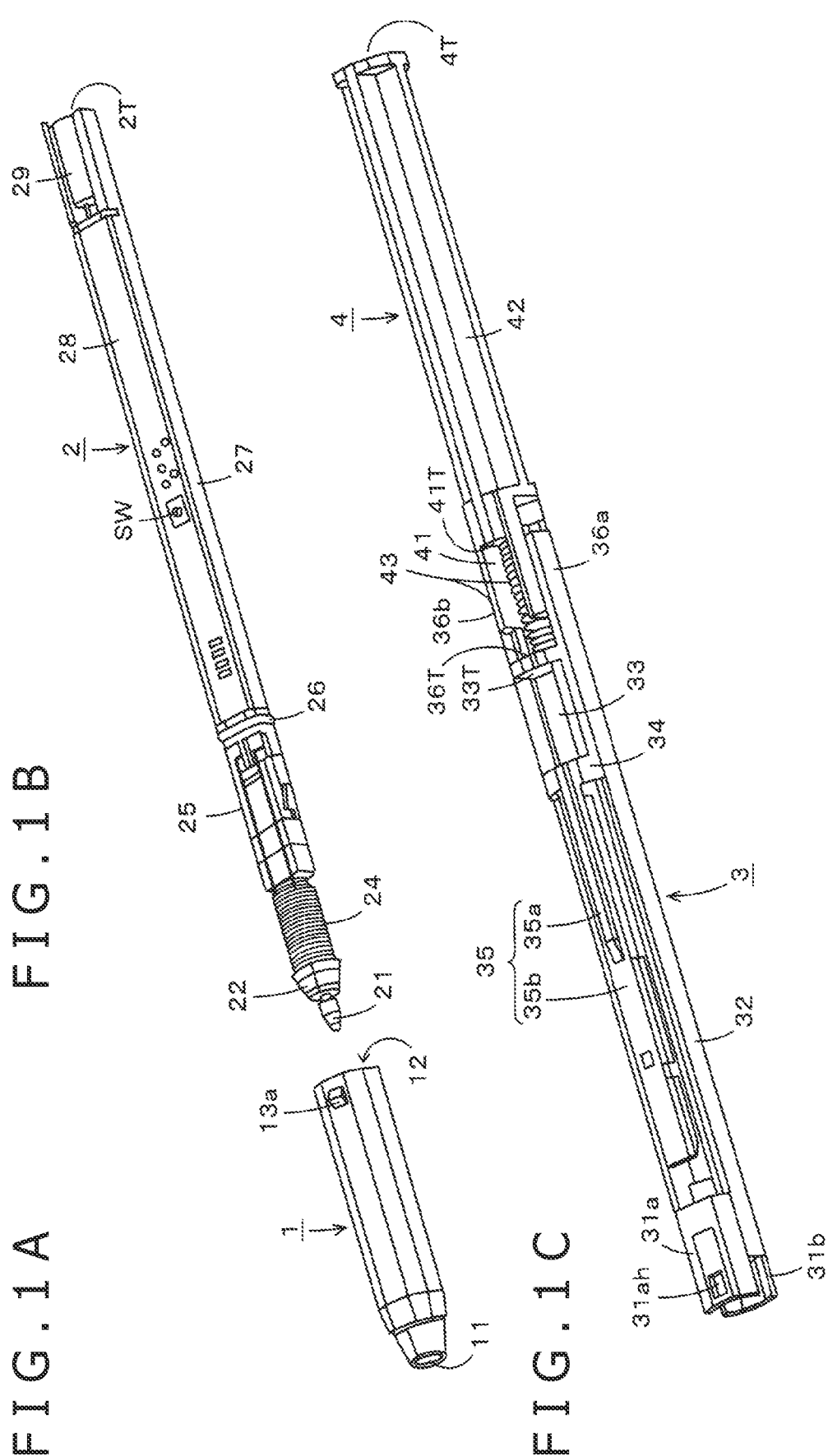

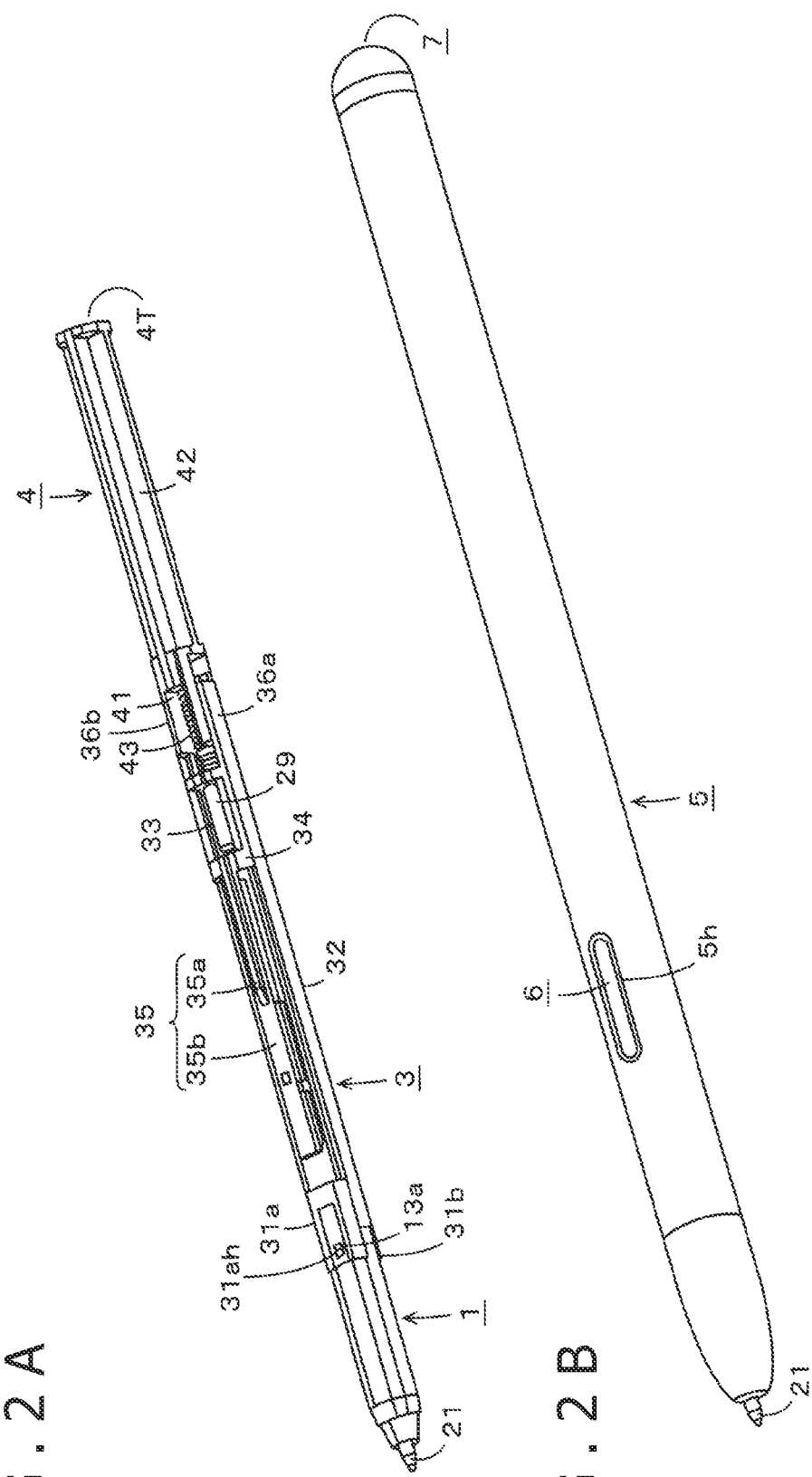
F I G. 2A
F I G. 2B

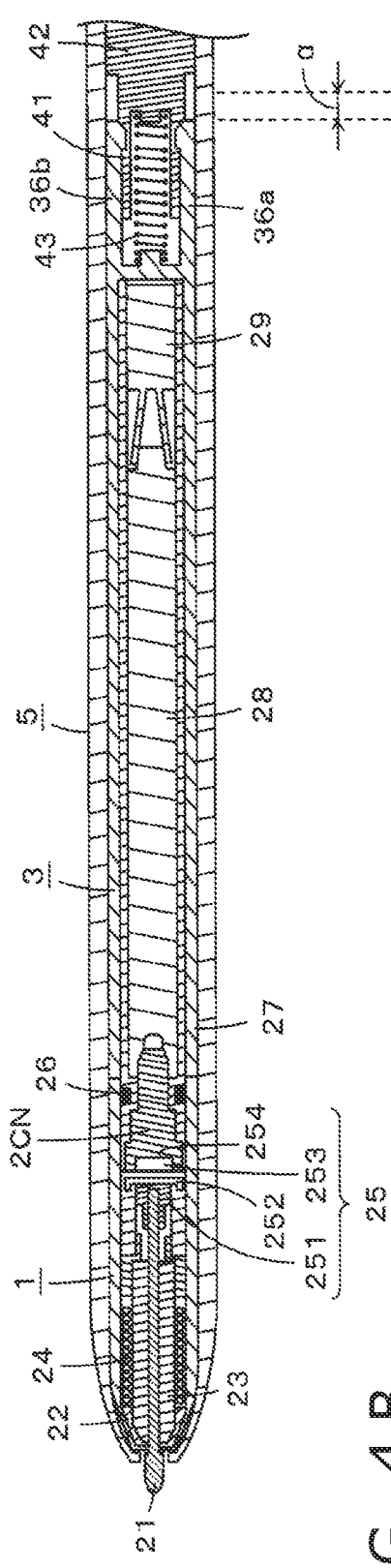
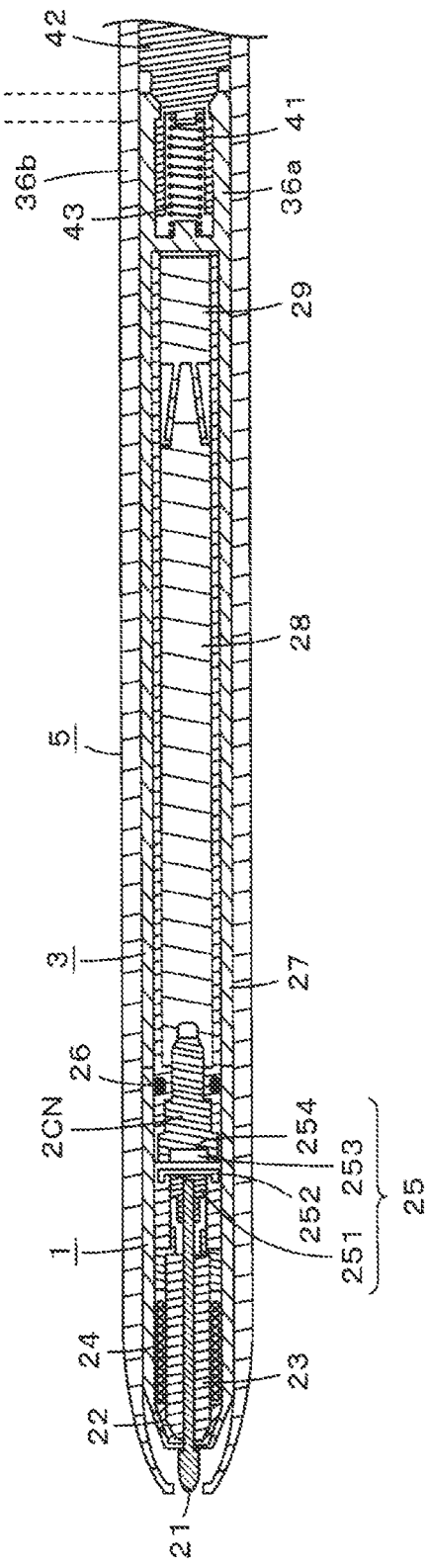
FIG. 4A
FIG. 4B

ELECTRONIC PEN

BACKGROUND

Technical Field

This disclosure relates to an electronic pen that enables input of information by indicating coordinates for a position detecting device mounted in electronic equipment such as a tablet personal computer (PC), for example.

Description of the Related Art

For example, in pieces of electronic equipment such as a tablet PC and a highly functional mobile phone terminal called a smartphone or the like, there is equipment for which indication input by an electronic pen is allowed in order to execute finer rendering input through a mounted position detecting device. In view of a use form with the tablet PC or highly functional mobile phone terminal, which is frequently used while being carried, the possibility of reducing the thickness of the electronic pen to make it more suitable to be carried is examined.

Moreover, there have been increasing opportunities for the pieces of electronic equipment such as a tablet PC and a highly functional mobile phone terminal and the electronic pen to be used under an environment in which they are liable to be affected by water, such as an outdoor space in rainy weather or a waterside of a sea, river, lake and marsh, pool, or the like. Hence, more importance has been given to necessity for waterproof measures also for the electronic pen in addition to the electronic equipment. Regarding waterproof measures for the electronic pen, there are techniques disclosed in PCT Patent Publication No. WO2015/122280 (hereinafter, patent document 1), PCT Patent Publication No. WO2017/149879 (hereinafter, patent document 2), and Japanese Patent Laid-open No. 2018-18149 (hereinafter, patent document 3), for example.

Patent document 1 discloses a technique of achieving overall sealing by which the whole of important parts of an electronic pen, such as a coil and a circuit board, is shielded. Patent document 2 discloses a technique of adding a waterproof function by filling with resin a hollow part in an internal casing in which constituent components to implement electronic pen functions and so forth. Patent document 3 discloses a technique of preventing entry of water and so forth from the external by disposing elastic components (cap member and sealing member) for waterproof on the pen tip side of the internal of a casing and at a circuit board connecting part.

The techniques disclosed in the above-described patent documents 1 to 3 are useful as techniques for adding a waterproof function to the electronic pen. However, regarding the electronic pen, there is a request for not only the waterproof function but also improvement to be what is more suitable for use for a folding-type portable terminal referred to as a foldable terminal or the like. Because the foldable terminal is of a folding type, it is difficult to dispose a hard protective layer such as strengthened glass on a display screen, unlike in existing portable terminals.

As such, to avoid scratching of the display screen of a foldable terminal by a core body of an electronic pen, a measure needs to be taken to avoid application of an excessive writing pressure to the display screen of the foldable terminal by the core body of the electronic pen. In this case, in the case of the waterproof techniques described in the above-described patent documents 1 to 3, although the core body is capable of performing a certain degree of sliding movement according to the writing pressure, the part that implements electronic pen functions other than the core body is fixed in a casing. Hence, measures for the foldable terminal cannot be taken in an easy and sufficient manner.

BRIEF SUMMARY

In view of the above, this disclosure provides an electronic pen that has a waterproof function and is suitable to be used for a foldable terminal.

In order to solve the above-described problem, there is provided an electronic pen including an electronic pen main part including a first sealing member that covers a circumference of tip side of the electronic pen main part and a second sealing member disposed along an outer edge of the electronic pen main part at a position separate from a tip toward a rear end side of the electronic pen main part, and an inside body that is tubular and has an inner wall surface with which the first sealing member and the second sealing member come to have contact through insertion of the tip side of the electronic pen main part into the inside body.

According to this electronic pen, the part between the first sealing member and the second sealing member in the electronic pen main part is sealed by the close contact between these sealing members and the inside body, and a waterproof function is given to the relevant part. Moreover, the electronic pen main part and the inside body are integrated and are allowed to move together. Owing to this, measures for the foldable terminal can also be taken in an easy and sufficient manner.

BRIEF DESCRIPTION OF THE SEVERAL VIEWS OF THE DRAWINGS

FIGS. 1A to 1C are perspective views for explaining the internal configuration of an electronic pen of an embodiment of the present disclosure;

FIGS. 2A and 2B are perspective views for explaining the electronic pen of the embodiment;

FIGS. 4A and 4B are sectional views for explaining the states before and after an excessive writing pressure is applied to the electronic pen of the embodiment of the present disclosure.

DETAILED DESCRIPTION

Figure 3:
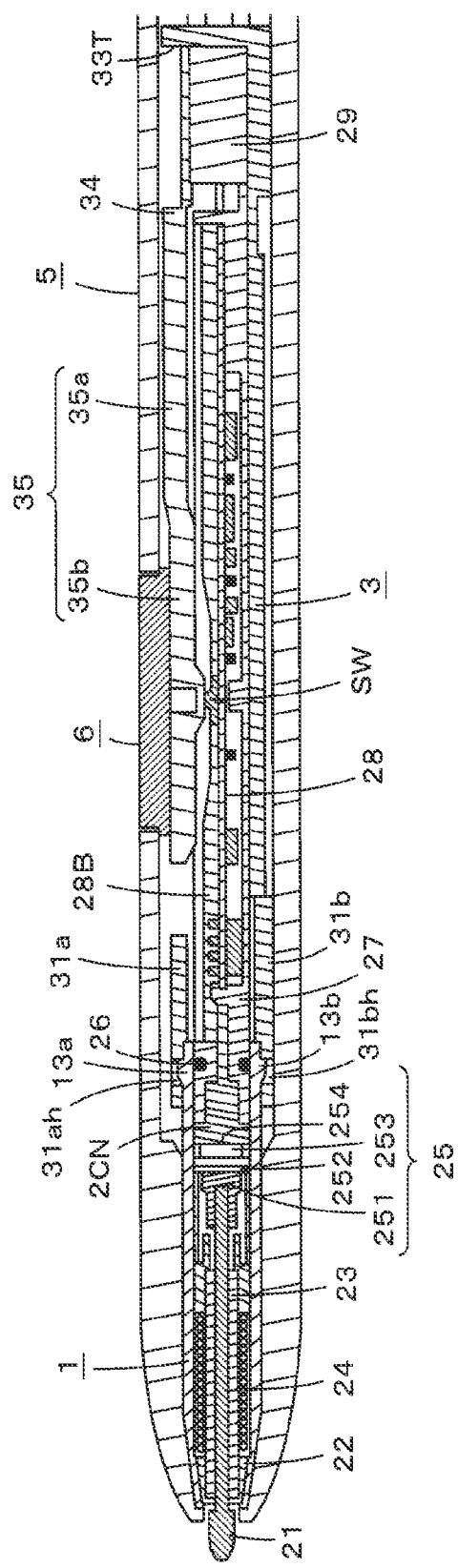
FIG. 3 is a sectional view for explaining a configuration of a pen tip side of the electronic pen of the embodiment of the present disclosure.

One embodiment of the electronic pen according to this disclosure will be described below with reference to the drawings. For example, an electronic pen of the electromagnetic induction system includes a resonant circuit configured by a coil and a capacitor being connected and performs position indication and notification regarding the writing pressure by performing transmission and reception of a magnetic field with a position detecting device. Hence, in the case of the electronic pen of the electromagnetic induction system, the coil is disposed on a pen tip side of the electronic pen. However, a change is caused in the electrical characteristic if this coil part gets wet with water, giving rise to a need to provide a waterproof measure for the coil part.

Moreover, in the case of an electronic pen of the active capacitive system, a coil for battery charging is sometimes mounted therein, giving rise to a need to provide a waterproof measure for the coil part. As described above, the electronic pens include ones of various systems, and the necessity to provide a waterproof measure in each of them has become increasingly high. This disclosure can be applied to various electronic pens that have a place for which a waterproof measure should be taken. In the following, to make explanation simple, description will be given by taking as an example the case in which this disclosure is applied to an electronic pen of the electromagnetic induction system.

FIGS. 1A to 1C are perspective views for explaining the internal configuration of the electronic pen of the embodiment. As illustrated in FIGS. 1A to 1C, the electronic pen of this embodiment includes four major parts, i.e., an inside body 1, an electronic pen main part 2, a main part holder 3, and an elastic body holder 4. As illustrated in FIG. 1A, the inside body 1 is a tubular body in which the tip side is tapered (taper shape) and the inside thereof is hollow. A tip opening part 11 is provided at a tip of the inside body 1, and a rear end opening part 12 is provided at rear end of the inside body 1. An upper surface and a lower surface of the inside body 1 are formed into a flat surface shape, and a fitting protrusion 13a is disposed on a rear end side of the upper surface of the inside body 1. Although being invisible in FIG. 1A, there is also disposed a fitting protrusion 13b at a position opposite to the fitting protrusion 13a, on the rear end side of the lower surface of the inside body 1.

The electronic pen main part 2 implements electronic pen functions. As illustrated in FIG. 1B, the appearance of the electronic pen main part 2 includes a core body 21, a first sealing member 22, a coil 24, a writing pressure detector 25, a second sealing member 26, a board holding part 27, a circuit board 28, and a battery 29. The core body 21 is a bar-shaped component and includes a pen tip part with a rounded tip and a shaft part extended from the pen tip part toward the rear end side.

The first sealing member 22 is, for example, a component that is formed of an elastic material such as synthetic rubber and has a thick cup shape. A rear end surface of the first sealing member 22 is opened. In addition, an opening is provided also in a front-end surface of the first sealing member 22 to allow insertion and withdrawal of the core body 21. The first sealing member 22 is mounted on the tip side of the electronic pen main part 2 and has close contact with the electronic pen main part 2 in such a manner as to cover the circumference of the tip side. The coil 24 is formed by an insulated conducting wire being wound around a side surface of a ferrite core 23, which is invisible in FIGS. 1A to 1C. Both ends of the insulated conducting wire that configures the coil 24 extend to the rear end side and are connected to a capacitor disposed on the circuit board 28 to be described later. This causes the coil 24 and the capacitor to form a resonant circuit.

The writing pressure detector 25 internally includes a variable-capacitance capacitor whose capacitance changes in response to pressing of the core body 21. This variable-capacitance capacitor is connected in parallel to the resonant circuit including the coil 24 and the capacitor. As a result, information indicating the writing pressure applied to the core body 21 is allowed to also be transmitted in such a manner as to be included in a magnetic field (signal) transmitted from the resonant circuit. The second sealing member 26 is, for example, obtained through a line-shaped body having a certain degree of thickness being formed into a ring shape with an elastic material such as synthetic rubber and is disposed in close contact with the board holding part 27 along the outer edge of the board holding part 27 that is located at a rear stage of the writing pressure detector 25 and is formed into a tubular shape.

The board holding part 27 is disposed at a rear stage of the second sealing member 26 connected to the writing pressure detector 25 and has a half-pipe shape in which the upper surface side is opened except for the part connected to the writing pressure detector 25. The board holding part 27 includes a board area and a battery area. As illustrated in FIG. 1B, the circuit board 28 is mounted on the board area of the board holding part 27, and the battery 29 is mounted on the battery area.

The circuit board 28 is a component on which an electronic circuit is formed by various circuit parts such as the capacitor for the resonant circuit connected in parallel to the coil 24, an integrated circuit (IC) for control, and a pressing-down switch (button switch) SW. The pressing-down switch SW is for implementing what is generally called a side switch that is disposed on the side surface of the electronic pen to be operated by a user. That is, it is possible to send out magnetic fields (signals) different between when the pressing-down switch SW is pressed down and when it is not pressed down.

The electronic pen of this embodiment is one of the electromagnetic induction system also as described above and operates through generation of a current in the coil by action of the magnetic field. Accordingly, basically, a battery that supplies drive power is unnecessary. However, the electronic pen of this embodiment includes circuit parts for which supply of drive power is necessary, such as a communication circuit of a Bluetooth (registered trademark) system, for example, and hence, the battery 29 for supplying drive power to these circuit parts is mounted. The communication circuit is used for giving notification regarding information relating to the electronic pen to the terminal side including a position detecting device, and so forth, for example.

The inside body 1 is mounted on the tip side of the electronic pen main part 2 through insertion of the electronic pen main part 2 from the pen tip side from the rear end opening part 12. In this case, the outer shape of the first sealing member 22 is a shape similar to that of a corresponding inside part of the inside body 1. However, the size of the first sealing member 22 is slightly larger than that of the corresponding inside part of the inside body 1. Similarly, the outer shape of the second sealing member 26 is the same shape as a corresponding inside part of the inside body 1. However, the size of the second sealing member 26 is slightly larger than that of the corresponding inside part of the inside body 1.

As described above, the first sealing member 22 and the second sealing member 26 are both formed of an elastic material. Accordingly, when the electronic pen main part 2 is inserted from the pen tip side from the rear end opening part 12 of the inside body 1 and is pushed into a fixed position, each of the first sealing member 22 and the second sealing member 26 comes to have close contact with the inner wall of the inside body 1 at a corresponding position. As a result, the part from the first sealing member 22 to the second sealing member 26 in the electronic pen main part 2 is sealed by the close contact of the inside body 1 with the first sealing member 22 and the second sealing member 26, preventing entry of water and so forth. That is, a waterproof function can be added for the part covered by the inside body 1 in the electronic pen main part 2.

Further, a waterproof measure needs to be provided also for the part of the circuit board 28. However, when the inside body 1 is extended to the rear end side, pressing-down operation of the pressing-down switch SW becomes difficult. As such, in this embodiment, a waterproof function is added also to the part of the circuit board 28 by covering the circuit board 28 with resin. Specifically, also as described later, the waterproof function is added to the whole of the circuit board area of the board holding part 27 by covering the circuit board 28 by a liquid plastic that cures by ultraviolet (UV) (UV bond), filling the inside of the board holding part 27 with the liquid plastic, and curing the liquid plastic through irradiation with UV. In this case, to allow operation of the pressing-down switch SW, the thickness of the liquid plastic is set to be thin at the relevant part.

The main part holder 3 is for holding the electronic pen main part 2 and includes connecting plates 31*a* and 31*b*, a circuit board holding part 32, a battery holding part 33, a support part 34, a pusher part 35, and connecting arms 36*a* and 36*b*. Into the main part holder 3, from the side of the connecting plates 31*a* and 31*b*, the electronic pen main part 2 on which the inside body 1 is mounted is inserted from the rear end side, and a rear end surface 2T of the electronic pen main part 2 is made to abut against a bottom surface 33T of the battery holding part 33. The connecting plates 31*a* and 31*b* sandwich a rear end part of the inside body 1 from the upper and lower sides to hold the electronic pen main part 2.

In the connecting plate 31*a*, as illustrated in FIG. 1C, a fitting hole 31*ah* is provided. Moreover, in the connecting plate 31*b*, a fitting hole 31*bh* is provided at a position opposed to the fitting hole 31*ah* of the connecting plate 31*a*, although not illustrated. Accordingly, the fitting protrusion 13*a* on the upper surface of the inside body 1 fits into the fitting hole 31*ah* of the connecting plate 31*a*, and the fitting protrusion 13*b* on the lower surface of the inside body 1 fits into the fitting hole 31*bh* of the connecting plates 31*b*. As a result, the electronic pen main part 2 on which the inside body 1 is mounted does not easily come off the main part holder 3.

The part of the circuit board holding part 32 and the battery holding part 33 is made to have a half-pipe shape in which the upper surface side is opened. The support part 34 is formed into an arch shape at a boundary part between the circuit board holding part 32 and the battery holding part 33. Hence, the battery area of the board holding part 27 of the electronic pen main part 2 passes under the support part 34 and reaches the battery holding part 33 on the rear side of the support part 34. In this case, the board area of the board holding part 27 of the electronic pen main part 2 is located at the circuit board holding part 32 on the front side of the support part 34.

The pusher part 35 extends in a hollow portion of the main part holder 3 from the support part 34 toward the pen tip side and passes directly above the pressing-down switch SW of the circuit board 28 of the electronic pen main part 2. As illustrated in FIG. 1C, the pusher part 35 is an elongated plate-shaped part including a shaft part 35*a* and a pressing part 35*b*. Also as described above, the upper surface of the board holding part 27 of the electronic pen main part 2 and the upper surface of the circuit board holding part 32 of the main part holder 3 are both opened. Hence, pressing-down operation of the pressing-down switch SW of the circuit board 28 is enabled through the pressing part 35*b* of the pusher part 35.

As illustrated in FIG. 1C, the rear end of the pusher part 35 is fixed to the support part 34. Thus, the pusher part 35 acts as a leaf spring with the support part 34 being a fulcrum. Accordingly, when the upper surface of the pressing part 35*b* of the pusher part 35 is pressed, the pressing part 35*b* lowers and presses down the pressing-down switch SW of the circuit board 28. When the pressing applied to the upper surface of the pressing part 35*b* is cancelled, the pusher part 35 acts as the leaf spring, and the pressing part 35*b* returns to the original position to cancel the pressing-down of the pressing-down switch SW. As described above, the pusher part 35 is a member for configuring a side switch.

The connecting arms 36*a* and 36*b* enable connection to the elastic body holder 4 and connect the main part holder 3 to the elastic body holder 4 in such a manner as to sandwich a holding part 41 of the elastic body holder 4 to be described later from the left and right sides. Hence, the electronic pen main part 2 on which the inside body 1 is mounted is held by the main part holder 3, and this main part holder 3 is connected to the elastic body holder 4.

The elastic body holder 4 includes the holding part 41 and an extended part 42. As illustrated in FIG. 1C, a coil spring 43 as an elastic body is held by the holding part 41. The extended part 42 extends from the rear end surface of the holding part 41 toward the rear end side and sets the length of an internal structure (part including the inside body 1, the electronic pen main part 2, the main part holder 3, and the elastic body holder 4) of the electronic pen of this embodiment to a predetermined length. Groove parts are provided in left and right side surfaces of the holding part 41, and the connecting arms 36*a* and 36*b* of the above-described main part holder 3 fit into these left and right groove parts. This causes the main part holder 3 to be connected to the elastic body holder 4.

Projecting parts protruding inward are disposed at rear end parts of the connecting arms 36*a* and 36*b* and engage with front end parts of the left and right side surface groove parts of the holding part 41. As a result, the main part holder 3 is prevented from easily coming off the elastic body holder 4. In addition, the main part holder 3 is allowed to be pushed and return in an axial center direction of the electronic pen, that is, make slide movement, relative to the elastic body holder 4. In the state in which the main part holder 3 is connected to the elastic body holder 4, as illustrated in FIG. 1C, the coil spring 43 is sandwiched by an outside bottom surface 36T of the main part holder 3 and an inside bottom surface 41T of the holding part 41 of the elastic body holder 4. The coil spring 43 acts to cause the main part holder 3 and the elastic body holder 4 to separate from each other.

However, suppose that a predetermined writing pressure, for example, a writing pressure equal to or higher than 300 g (grams), is applied to the core body 21 of the electronic pen main part 2 mounted on the main part holder 3 in the state in which a rear end surface 4T of the elastic body holder 4 is fixed. In this case, the main part holder 3 is pushed toward the side of the elastic body holder 4, and the coil spring 43 contracts, so that the distance between the outside bottom surface 36T of the main part holder 3 and the inside bottom surface 41T of the holding part 41 of the elastic body holder 4 shortens. Moreover, when the application of the writing pressure equal to or higher than 300 g is ceased, the coil spring 43 extends, and the distance between the outside bottom surface 36T of the main part holder 3 and the inside bottom surface 41T of the holding part 41 of the elastic body holder 4 returns to the original distance.

As described above, by being interposed between the main part holder 3 and the elastic body holder 4, the coil spring 43 implements action by which the main part holder 3 that houses the electronic pen main part 2 is pushed in the axial center direction and returns according to the writing pressure applied to the core body 21. In this embodiment, the coil spring 43 does not contract when the writing pressure applied to the core body 21 of the electronic pen main part 2 is lower than the predetermined writing pressure (for example, lower than 300 g). However, when the writing pressure applied to the core body 21 becomes equal to or higher than the predetermined writing pressure (equal to or higher than 300 g), the coil spring 43 contracts and causes action to retract the core body 21 in the axial center direction.

FIGS. 2A and 2B are perspective views for explaining the electronic pen of the embodiment. FIG. 2A illustrates the internal structure of the electronic pen in the state in which the respective parts of the inside body 1, the electronic pen main part 2, the main part holder 3, and the elastic body holder 4 described with use of FIGS. 1A to 1C are connected. That is, FIG. 2A illustrates the state in which the electronic pen main part 2 on which the inside body 1 is mounted is mounted on the main part holder 3 and the main part holder 3 is connected to the elastic body holder 4.

FIG. 2B illustrates the appearance of the electronic pen in such a form as to be used by a user (end user) through the internal structure of the electronic pen illustrated in FIG. 2A being housed in an outside casing 5. The outside casing 5 is a tubular body in which the pen tip side is tapered (taper shape), a tip opening is provided at the tip on the pen tip side, and a rear end opening is provided on the rear end side. The internal structure of the electronic pen illustrated in FIG. 2A is inserted from the rear end opening of the outside casing 5, and the core body 21 is caused to protrude from the tip opening. In this state, a tip part of the inside body 1 enters the state in which it abuts against an inside tip part of the outside casing 5.

Further, a columnar rear end cap 7 is fitted into the rear end opening of the outside casing 5. The rear end cap 7 includes a fitted part fitted into the internal of the outside casing 5 and an exposed part exposed to the external. The outer diameter of the fitted part of the rear end cap 7 is set slightly longer than the inner diameter of the outside casing 5. Hence, by the whole of the rear end cap 7 being pushed into the outside casing 5, the rear end cap 7 is prevented from easily coming off the outside casing 5. The outer diameter of the exposed part of the rear end cap 7 is substantially the same as that of the outside casing 5.

When the rear end cap 7 is properly fitted into the outside casing 5, provided is the state in which the front end surface of the fitted part of the rear end cap 7 abuts against the rear end surface 4T of the extended part 42 of the elastic body holder 4 of the internal structure illustrated in FIG. 2A. As a result, the internal structure illustrated in FIG. 2A is sandwiched by the inside tip part of the outside casing 5 and the fitted part of the rear end cap 7 in the outside casing 5, and the position thereof is restricted in the outside casing 5.

In this manner, the internal structure illustrated in FIG. 2A is mounted in the outside casing 5 and is used as the electronic pen. In this case, when a writing pressure equal to or higher than a predetermined value is applied to the core body 21 protruding from the tip opening of the outside casing 5, the coil spring 43 sandwiched by the main part holder 3 and the elastic body holder 4 contracts, and the main part holder 3 makes a sliding movement toward the rear end side, so that the core body 21 is housed in the outside casing 5. This prevents the core body 21 from applying a writing pressure equal to or higher than the predetermined value to the operation surface. When the application of the writing pressure equal to or higher than the predetermined value to the core body 21 is ceased, the coil spring 43 extends, and the core body 21 returns to the state in which it protrudes from the tip opening of the outside casing 5.

Further, a side surface opening part 5h is provided in the side surface of the outside casing 5. The side surface opening part 5h is provided at a position corresponding to the pressing-down switch SW disposed on the circuit board 28 of the electronic pen main part 2, and this position corresponds to the position of the pressing part 35b of the pusher part 35. An operation part 6 is fitted into the side surface opening part 5h. This allows the user to press down the pressing-down switch SW of the circuit board 28 through the pressing part 35b of the pusher part 35 when pressing the operation part 6. When the pressing-down operation to the operation part 6 is cancelled, the pressing part 35b returns to the original position by the leaf spring action of the pusher part 35, and the operation part 6 also returns to the original state in response to this.

FIG. 3 is a diagram for explaining the configuration of the pen tip side of the electronic pen of the embodiment and is a sectional view in the case in which the operation part 6 is set on the upper side, the electronic pen is cut along the longitudinal direction of the electronic pen to be divided into the far side and the near side, and the near side is removed. In the state in which the internal structure illustrated in FIG. 2A is mounted in the outside casing 5, the electronic pen of this embodiment enters the state in which the pen tip part of the core body 21 of the electronic pen main part 2 protrudes from a tip opening part of the outside casing 5 as illustrated in FIG. 2B and FIG. 3. The shaft part of the core body 21 penetrates through a through-hole of the ferrite core 23 that is a tubular body, and reaches the writing pressure detector 25. The coil 24 is formed around the side surface of the ferrite core 23 through the insulated conducting wire being wound. On the front end side of the coil 24, the first sealing member 22 is disposed to cover the front end side of the ferrite core 23.

The writing pressure detector 25 includes a pressing component 251, a first electrode 252, a dielectric 253, and a second electrode 254. The rear end side of the shaft part of the core body 21 is inserted into the pressing component 251. A gap is provided between the first electrode 252 and one surface of the dielectric 253 opposite thereto, and the first electrode 252 comes closer to and separates further away from the dielectric 253 through the pressing component 251 according to the writing pressure applied to the pen tip part of the core body 21. The second electrode 254 is disposed on the other surface of the dielectric 253. This allows detection of the writing pressure in reference to the capacitance between the first electrode 252 and the second electrode 254 that changes according to the writing pressure.

A connecting member 2CN is disposed at a rear stage of the second electrode 254. The connecting member 2CN connects the writing pressure detector 25 and the board holding part 27. That is, as illustrated in FIG. 3, the writing pressure detector 25 is connected to the front stage of the connecting member 2CN, and a tip part of the board holding part 27 on the pen tip side fits to the rear stage of the connecting member 2CN. As a result, the writing pressure detector 25 and the board holding part 27 are connected through the connecting member 2CN. The pen tip side of the board holding part 27 is formed into a tubular shape. Around the circumference of the side surface thereof, the second sealing member 26 with a ring shape is disposed in close contact with the circumference of the side surface (outer edge). Moreover, the inside body 1 is mounted on the pen tip side of the electronic pen main part 2 also as described above.

In this case, also as described above and as illustrated in FIG. 3, the pen tip side of the internal of the inside body 1 is in close contact with the first sealing member 22, and the rear end side of the internal of the inside body 1 is in close contact with the second sealing member 26. As a result, the part including the coil 24 and the writing pressure detector 25 in the inside body 1 is sealed by the close contact of the first sealing member 22 and the second sealing member 26 with the inside body 1, and a waterproof function is implemented.

The circuit board 28 and the battery 29 are mounted on the board holding part 27. The upper surface side of the circuit board 28 is filled with the UV bond, and the UV bond cures in the state of being in close contact with the circuit board 28 and the inner wall of the board holding part 27 by irradiation with UV, and a protective layer 28B is formed. Thus, a waterproof function is implemented for the part of the circuit board 28 also as described above. The circuit board 28 is a double-sided board configured through circuit parts being disposed on both surfaces. However, entry of liquid such as water into the lower surface side of the circuit board 28 can also be prevented by filling the inside of the board holding part 27 with the UV bond.

The pressing-down switch SW is disposed on the upper surface of the circuit board 28. For the part of the pressing-down switch SW, the thickness of the protective layer 28B based on the UV bond is set to be thin to allow pressing-down operation thereof. In the main part holder 3, the upper surface side of the part at which at least the circuit board 28 of the electronic pen main part 2 is located is opened, and this part is made to have a half-pipe shape. Moreover, as illustrated in FIG. 3, the main part holder 3 includes the pusher part 35 that is an elongated plate-shaped body extended in a hollow portion of the main part holder 3 from the support part 34 toward the pen tip side.

The pusher part 35 includes the shaft part 35a and the pressing part 35b. The pressing part 35b is present at such a position as to be capable of pressing down the pressing-down switch SW disposed on the circuit board 28. The pressing part 35b includes a projecting part on the lower side as illustrated in FIG. 3, and it is possible to press down the pressing-down switch SW through the pressing part 35b of the pusher part 35 by pressing down the operation part 6 disposed in the side surface opening part 5h of the outside casing 5.

When pressing applied to the operation part 6 is cancelled, the pusher part 35 acts as a leaf spring. Accordingly, when pressing applied to the operation part 6 is cancelled, the pusher part 35 acts to return to the original state with the support part 34 being a fulcrum. This cancels pressing-down of the pressing-down switch SW, and the operation part 6 is also pushed up to return to the original state. As described above, in the case of the electronic pen of this embodiment, a side switch that can reliably switch the pressing-down/non-pressing-down state is implemented with a simple configuration.

Moreover, the operation part 6 includes, at the front end, a front-end projecting part that slightly projects toward the pen tip and includes, at the rear end, a rear-end projecting part that slightly projects toward the rear side. Thus, the operation part 6 is prevented from easily coming off the side surface opening of the outside casing 5. That is, merely the front-end projecting part and the rear-end projecting part engage with the inner wall of the outside casing 5, and the operation part 6 is simply put on the upper surface of the pressing part 35b of the pusher part 35.

Hence, even when the main part holder 3 on which the electronic pen main part 2 is mounted is pushed toward the rear side of the electronic pen due to application of a writing pressure equal to or higher than the predetermined value to the pen tip part of the core body 21 as described above, the operation part 6 does not interfere with slide movement of the main part holder 3. In the case of mounting the operation part 6 to the side surface opening of the outside casing 5, the operation part 6 can be mounted by being pushed into the side surface opening. Moreover, in the case of detaching the operation part 6 from the outside casing 5, the operation part 6 can easily be detached from the inside of the outside casing 5 by withdrawing the internal structure illustrated in FIG. 2A from the outside casing 5.

FIGS. 4A and 4B are diagrams for explaining the states before and after an excessive writing pressure is applied to the electronic pen of the embodiment and are sectional views in the case in which the side on which the operation part 6 is located is set to the upper side, the opposite side thereto is set to the lower side, the electronic pen is cut along the longitudinal direction to be divided into the upper side and the lower side, and the upper side is removed. In FIGS. 4A and 4B, FIG. 4A illustrates the state in which the writing pressure is not applied to the pen tip part of the core body 21 (writing pressure=0 g). FIG. 4B illustrates the state in which a writing pressure equal to or higher than 300 g is applied to the pen tip part of the core body 21.

In the case of the electronic pen of this embodiment, when the writing pressure applied to the pen tip part of the core body 21 is equal to or higher than 0 g but is lower than 300 g, the form in which the pen tip part of the core body 21 protrudes from the tip opening of the outside casing 5 is kept as illustrated in FIG. 4A. Accordingly, in the case in which the electronic pen of this embodiment is used on an operation surface of a foldable terminal, the electronic pen of this embodiment can be allowed to normally function as the electronic pen when the writing pressure is lower than 300 g. However, when the writing pressure applied to the pen tip part of the core body 21 becomes equal to or higher than 300 g, the coil spring 43 starts to contract, and the main part holder 3 on which the electronic pen main part 2 is mounted gradually moves toward the rear end side, so that the pen tip part of the core body 21 enters the inside of the outside casing 5.

By such an operation, application of the writing pressure equal to or higher than 300 g to the operation surface by the pen tip part of the core body 21 is avoided. When the writing pressure applied to the pen tip part of the core body 21 has become a predetermined value equal to or higher than 300 g, there is provided the state in which the pen tip part of the core body 21 is housed in the outside casing 5 and does not protrude from the tip opening of the outside casing 5 as illustrated in FIG. 4B. In this case, application of the writing pressure equal to or higher than 300 g to a very small range in the operation surface by the pen tip part of the core body 21 is prevented. Accordingly, it is possible to prevent the occurrence of the situation in which damage is given to the operation surface of the foldable terminal on which a firm protective layer such as strengthened glass cannot be disposed, due to application of an excessive writing pressure thereto through the pen tip part of the core body 21. Furthermore, when the writing pressure applied to the pen tip part of the core body 21 becomes lower than 300 g, the coil spring 43 extends and can return to the state illustrated in FIG. 4A.

In the case of the electronic pen of this embodiment, as illustrated by drawing dotted lines in FIGS. 4A and 4B, slide movement of the internal structure including the inside body 1, the electronic pen main part 2, the main part holder 3, and the elastic body holder 4 can be made toward the rear end side by a distance a in the outside casing 5. Even when the main part holder 3 on which the electronic pen main part 2 is mounted makes slide movement according to the writing pressure applied to the pen tip part of the core body 21 as described above, a physical change does not occur in the part of the inside body 1 mounted on the electronic pen main part 2 and the part of the protective layer 28B on the circuit board 28. Thus, even when the internal structure makes slide movement, the waterproof function for the part of the inside body 1 and the waterproof function by the protective layer 28B disposed on the circuit board 28 are neither deteriorated nor lost.

Effects of Embodiment

In the electronic pen of the above-described embodiment, for the part of the coil 24 and the writing pressure detector 25, a waterproof function can be implemented by the inside body 1, the first sealing member 22, and the second sealing member 26. Moreover, for the part of the circuit board 28, a waterproof function can be implemented by disposing the protective layer 28B based on the UV bond. These waterproof functions are not affected even when the main part holder 3 on which the electronic pen main part 2 is mounted makes slide movement according to the writing pressure applied to the pen tip part of the core body 21, and the waterproof functions for the relevant parts are neither deteriorated nor lost. Accordingly, it is possible to implement an electronic pen to which the waterproof functions are added and that is suitable to be used for a foldable terminal.

Modification Examples

In the case of the electronic pen of the above-described embodiment, the part connected to the battery 29 is also covered by the protective layer 28B being disposed on the circuit board 28, and hence, a waterproof measure is not provided for the part of the battery 29. However, a waterproof measure may be provided for it. Moreover, in the electronic pen of the above-described embodiment, the waterproof function is added by use of the UV bond for the part of the circuit board 28. However, the configuration is not limited thereto. It is also possible to add the waterproof function by using various resin materials.

Further, in the electronic pen of the above-described embodiment, the elastic body holder 4 includes the extended part 42. However, the configuration is not limited thereto. It is also possible to implement the function of the extended part 42 by extending the length of the fitted part of the rear end cap 7 or employing a configuration in which the outside casing 5 is divided into two parts of a front-stage part that houses the internal structure and a rear-stage part that holds the internal structure from the rear end side.

Further, in the electronic pen of the above-described embodiment, the coil spring 43 is used as the elastic body located between the main part holder 3 and the elastic body holder 4. However, the configuration is not limited thereto. For example, various elastic bodies that can function similarly to the coil spring 43, such as synthetic rubber and sponge, can be used.

Moreover, in the electronic pen of the above-described embodiment, in the operation part 6, the projecting parts that project forward and rearward engage with the inner wall of the outside casing 5 on the front and rear sides of the side surface opening part 5h to prevent the operation part 6 from coming off the outside casing 5. However, the configuration is not limited thereto. In the part of the pressing part 35b of the pusher part 35, a slit having a part in which the lower side projects in the directions intersecting the axial center direction (longitudinal direction of the electronic pen), like a reverse-T-shaped slit, for example, is provided along the axial center direction. Meanwhile, on the lower side of the operation part 6, an engaging part (protruding part) having a part in which the lower side projects in the directions intersecting the axial center direction is provided corresponding to the slit of the pressing part 35b.

In this case, when the internal structure illustrated in FIG. 2A is mounted on the outside casing 5, after the connecting plate 31a passes under the side surface opening part 5h, the operation part 6 is fitted into the side surface opening part 5h, and the internal structure is pushed toward the pen tip side. This causes the engaging part of the operation part 6 to be fitted into the slit of the pressing part 35b and allows the operation part 6 to be attached to the pressing part 35b. The engaging part of the operation part 6 is fitted into the slit in the axial center direction in the pressing part 35b. Thus, even when the internal structure makes slide movement in the axial center direction, the movement is not impeded. In addition, the operation part 6 does not come off the pressing part 35b.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen, comprising:
   an electronic pen main part including a first sealing member that covers a circumference of a tip side of the electronic pen main part and a second sealing member disposed along an outer edge of the electronic pen main part at a position separate from a tip toward a rear end side of the electronic pen main part;
   an inside body that is tubular and has an inner wall surface with which the first sealing member and the second sealing member come into contact through insertion of the tip side of the electronic pen main part into the inside body;
   an elastic body holder having an elastic body on a tip side of the elastic body holder; and
   an electronic pen main part holder that houses a predetermined part of the electronic pen main part in a range extending from a rear end of the electronic pen main part in a front end direction, has a rear end surface in contact with the elastic body, and is connected to the elastic body holder slidably in an axial center direction of the electronic pen.

2. An electronic pen, comprising:

an electronic pen main part including a first sealing member that covers a circumference of a tip side of the electronic pen main part and a second sealing member disposed along an outer edge of the electronic pen main part at a position separate from a tip toward a rear end side of the electronic pen main part;

an inside body that is tubular and has an inner wall surface with which the first sealing member and the second sealing member come into contact through insertion of the tip side of the electronic pen main part into the inside body;

an elastic body holder having an elastic body on a tip side of the elastic body holder;

an electronic pen main part holder that houses a predetermined part of the electronic pen main part in a range extending from a rear end of the electronic pen main part in a front end direction, has a rear end surface in contact with the elastic body, and is connected to the elastic body holder slidably in an axial center direction of the electronic pen; and an outside casing that houses the inside body, the electronic pen main part, the electronic pen main part holder, and the elastic body holder.

3. The electronic pen according to claim 1, wherein:

a circuit board and a board holding part that houses the circuit board and has a half-pipe shape in which an upper surface side is opened are connected to a rear stage of the second sealing member of the electronic pen main part, and an upper surface of the circuit board is covered by resin.

4. The electronic pen according to claim 1, wherein:

a coil is formed between the first sealing member and the second sealing member of the electronic pen main part.

5. An electronic pen, comprising:

an electronic pen main part including a first sealing member that covers a circumference of a tip side of the electronic pen main part and a second sealing member disposed along an outer edge of the electronic pen main part at a position separate from a tip toward a rear end side of the electronic pen main part;

an inside body that is tubular and has an inner wall surface with which the first sealing member and the second sealing member come into contact through insertion of the tip side of the electronic pen main part into the inside body;

an elastic body holder having an elastic body on a tip side of the elastic body holder;

an electronic pen main part holder that houses a predetermined part of the electronic pen main part in a range extending from a rear end of the electronic pen main part in a front end direction, has a rear end surface in contact with the elastic body, and is connected to the elastic body holder slidably in an axial center direction of the electronic pen; and an outside casing that houses the inside body, the electronic pen main part, the electronic pen main part holder, and the elastic body holder, wherein:

a circuit board on which a pressing-down switch is mounted is connected to a rear stage of the second sealing member of the electronic pen main part, a bar-shaped pusher part that extends in a hollow portion of electronic pen main part holder toward a pen tip side and passes above the pressing-down switch from a fixed part on the rear end side is disposed in the electronic pen main part holder, an opening part is provided at a position on a side surface of the outside casing corresponding to the pressing-down switch of the circuit board, and an operation part is disposed in the opening part, and the pressing-down switch of the circuit board is operated through the operation part and the pusher part.

\* \* \* \* \*